May 28, 1963 H. M. FREDERICK ETAL 3,091,669

MOUNTING DEVICE FOR A MAGNETIC TRANSDUCER HEAD

Filed May 14, 1957 3 Sheets-Sheet 1

*INVENTORS.*
HAROLD M. FREDERICK
*BY* ISAAC M. SHEAFFER JR.

Carl Fissell Jr.
AGENT

MOUNTING DEVICE FOR A MAGNETIC TRANSDUCER HEAD

Filed May 14, 1957 3 Sheets-Sheet 2

INVENTORS.
HAROLD M. FREDERICK
ISAAC M. SHEAFFER JR.
BY

AGENT

May 28, 1963 H. M. FREDERICK ETAL 3,091,669

MOUNTING DEVICE FOR A MAGNETIC TRANSDUCER HEAD

Filed May 14, 1957 3 Sheets-Sheet 3

INVENTORS.
HAROLD M. FREDERICK
ISAAC M. SHEAFFER JR.
BY
Carl Fissell Jr.
AGENT 3,091,669
Patented May 28, 1963

3,091,669

MOUNTING DEVICE FOR A MAGNETIC TRANSDUCER HEAD

Harold M. Frederick and Isaac M. Sheaffer, Jr., Berwyn, Pa., assignors to Burroughs Corporation, Detroit, Mich., a corporation of Michigan Filed May 14, 1957, Ser. No. 659,046
12 Claims. (Cl. 179—100.2)

This invention relates to a mounting device for mounting magnetic recorder and/or reproducer heads adjacent to a magnetizable record member, and more particularly, although not necessarily exclusively, is concerned with a head mounting device for use with magnetic recorder-reproducers employing a rotatable drum bearing a magnetizable recording medium thereon and an adjusting mechanism for moving the transducer head relative to the drum.

In drum type recording reproducing systems it has long been a problem to closely control the angular spacing between a so-called "read" head and its corresponding "write" head so that an accurate pulse distribution and timing operation can result therefrom. Further it is desirable to mount the transducer heads with respect to the record medium (drum) so that the air gap in the pole piece of the heads is disposed along an axis at a given point where the tangent to the drum at that point is perpendicular to the vertical axis projected through the heads. If the heads are separated from the drum surface by too large an air spacing inferior results are obtained. For best results, it is desirable that the closest possible spacing exist between the reading and writing portions of the head units and the surface of the drum. In the past it has been the practice to adjust the magnetic transducer or head tangentially with respect to the magnetic drum with which the former is to be used. Since, with respect to the periphery of the drum, the drum surface curves away from the head at every point along its surface it is at once apparent that the tangential type of adjustment tends to and most frequently does destroy the head to drum spacing which spacing is on the order of a few thousandths of an inch and is extremely critical. Any change in this critical spacing results in poor head to drum relationship with consequent inferior reproduction of the information recorded on the drum.

The present invention contemplates a technique utilizing novel apparatus which permits a vernier adjustment of the head assembly along a circumferential path around the drum thus maintaining accurate head to drum spacing, as opposed to the head to drum deviation which normally occurs when adjusting the head assembly tangentially of the drum.

In the past it has been difficult to obtain the desired results without using expensive bearings to support the heads. Also the spatial adjusting apparatus did not provide the degree of accuracy necessary for such applications as radar and telemetering.

Accordingly, it is an important object of the present invention to provide an efficient, reliable and accurate adjustable mounting device for holding a magnetic transducer head adjacent a drum type record member.

A further object of the invention is to provide a mounting structure for a magnetic transducer head which is extremely accurate in use yet which has no appreciable play even after considerable service.

Another object of the invention is to provide a mounting structure for a magnetic transducer head which includes means to permit several different adjustments of the head with respect to the information storage drum in order that the best performance of which the head is capable may be obtained.

Still another object of the invention is to provide an accurate high quality mount for a magnetic transducer head which may be adjusted in a simple and efficient manner so as to obtain maximum performance from the head and which, when it is properly adjusted, will always maintain accurate head to drum spacing.

For a better understanding of the present invention, together with other and further objects thereof, reference is had to the following description, taken in connection with the accompanying drawings, and its scope will be pointed out in the appended claims.

Figure 8:
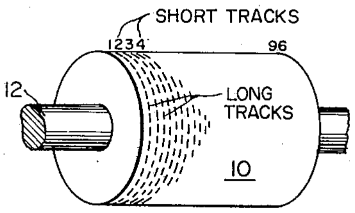
FIG. 8 is a schematic view on a reduced scale of the information storage drum of the present invention illustrating the interlacing of the tracks therearound.

The magnetic drum shown in the drawing illustrative of one form of the present invention, comprises a rotating storage device capable of selectively storing electrical pulse information on 96 separate circular tracks, as schematically shown in FIG. 8. While not necessarily so spaced, it is contemplated in the presently illustrated form of the invention, that the tracks will be spaced apart 1/16 inch center to center. Each track utilizes one write (recording) head and one read (pick-up) head. Forty eight of the tracks are designated "long" tracks, the remaining forty eight being "short" tracks. The 96 long and short tracks are interlaced axially along the drum surface as shown in FIG. 8. The heads in a unit assembly are associated only with every other track, all "long" or all "short" tracks. This technique results in a center-to-center spacing of 1/8 inch within each multiple-head assembly and permits the head unit to be packaged more efficiently and economically than heretofore. A magnetic pulse (electrical impulse of desired duration and amplitude at the head) is written on the magnetic iron oxide surface of the drum by a "write" head (lower right and left in FIG. 1). Rotation of the drum passes its magnetized surface under a "read" head (upper right and left in FIG. 1) which produces an output signal corresponding to the original electrical pulse input.

The storage time of the drum normally is fixed, being the time required for a given area of the drum surface to pass from a write head to a read head. All information is removed or obliterated from the drum tracks by an erase magnet (a permanent magnet in this embodiment, FIGS. 6 and 7) before the next drum revolution. The storage time thus depends on the angular displacement between the write and read heads (90° for the short tracks, the lower and upper head unit respectively on the left side of FIG. 1, and 270° for the long tracks, the lower and upper heads respectively on the right side of FIG. 1) and on the speed of the drum. The polar relationship between the various read and write heads, drum rotation and the erase magnet, is clearly illustrated in FIG. 1 by means of the circular dotted and full lines.

The present invention is particularly adapted for mounting a magnetic transducer adjacent to a magnetizable record member and it is particularly suitable for mounting a plurality of multiple head magnetic transducer assemblies or units in extremely close proximity to a drum type record or information storage member.

Figure 1:
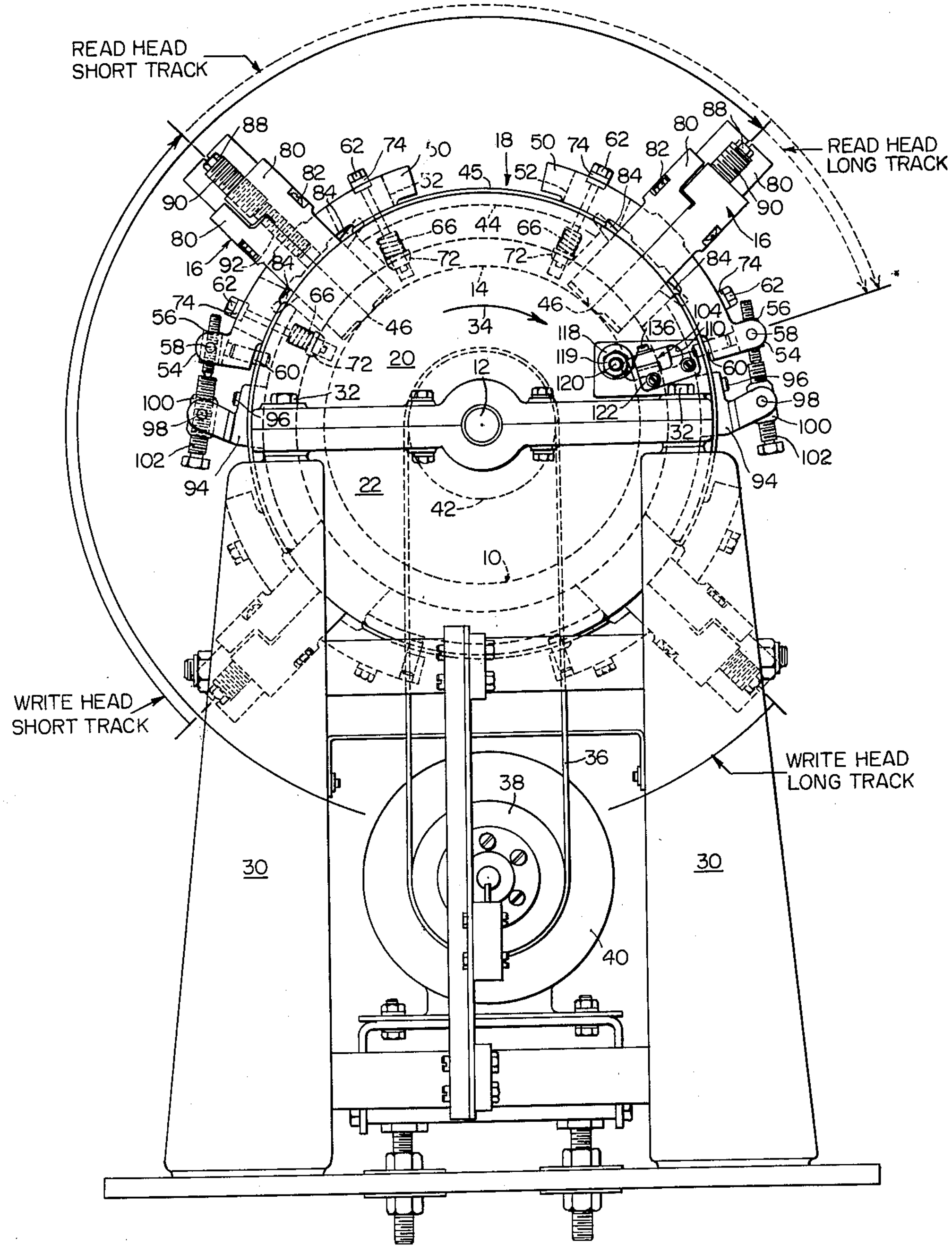
FIG. 1 is a side elevational view of one embodiment of a multiple transducer head mounting device in accordance with the present invention with the transducer heads disposed in proper relation to a recording drum.

Referring now to FIG. 1 there is shown such a drum 10 mounted for rotation on axially positioned shaft 12. The surface 14 of the drum employs a record medium (not shown) which may comprise magnetizable material such as iron oxide overlaid on a carrier medium, which has been bonded or otherwise affixed to the periphery of the drum.

Magnetic transducer units 16 are disposed around the periphery of the drum at an angle of approximately ninety degrees with respect to each other. The peripheral head spacing is, among other things, a function of the length of the various "read" and "write" tracks which must be placed on the peripheral surface of the magnetic drum by means of electrical pulses whose amplitude and length have been predetermined in accordance with the use for which the drum tracks are intended. Also, the electrical current used to write the aforementioned pulse information on the various tracks is relatively high, on the order of 110 milliamperes, in comparison with the read output current of ten microamperes, thus a problem arises involving "cross talk" from one head unit to another. By mounting a plurality of transducers in a single assembly, as distinguished from mounting a plurality of separate heads adjacent to a magnetic drum, and by displacing the reproduce assemblies a maximum distance from the record assemblies "cross talk" can be effectively reduced. Finally, the present structural configuration permits the housing for the drum to be made in two portions, as will be described presently, which construction is relatively inexpensive and simple to produce.

It is desirable to so mount each transducer head assembly 16 with respect to the drum 10 that a line extending through the air gaps in the core of the head will always be perpendicular to a tangent to the drum at the point where the head is situated over the drum. Since, as before stated, the head to drum spacing is critical any misadjustment thereof tends to cause an erroneous or faulty signal output due to changes in the electrical timing and distribution of the applied pulses.

Additionally it is desirable for the operator to be able to adjust the head assembly 16 relative to the drum surface. It also is desirable that the head be retractable out of the housing structure, as shown in FIG. 3, for repair, removal or maintenance without the necessity of dismantling both the head unit and/or the mounting assembly, and to replace the head assembly in the same position from which it had been removed without causing a net change in head to drum spacing.

In order to achieve these desirable features the drum is provided with a complementary shaped housing 18 comprising two complementary half portions 20 and 22. The external peripheral surface of each of the two portions 20 and 22 is provided with a plurality of head receiving apertures 24, FIGS. 2, 3 and 4. Resilient dust seals 26, FIG. 3, of sponge rubber or similar material, are located between the upper read units and the drum housing. When the heads are in operative position the seals are retained in apertures 24 by the flanges 28 bolted to the head units 16. Upright members 30 forming four vertically extending pedestals (only two of which are shown in FIG. 1) are utilized to support and cradle the lowermost half portion 22 of the drum housing 18. The two half portions when assembled, as shown, are bolted together, the bolts 32 passing through and into the upper portions of the pedestals 30. The drum 10 is rotatably mounted for movement—in the direction of the arrow 34—within the housing 18 in a manner set forth in detail and claimed in the co-pending application to C. B. Mansky and I. M. Sheaffer, Jr., entitled "Data Storage Apparatus," filed in the U.S. Patent Office, March 4, 1955, Serial No. 492,276, now Patent No. 2,916,726, and assigned to the same assignee as the present invention. Briefly, a belt 36 driven by pulley 38 attached to the drive shaft of a motor 40 rotates the drum 10 at the desired speed by means of the drive pulley 42.

Figure 2:
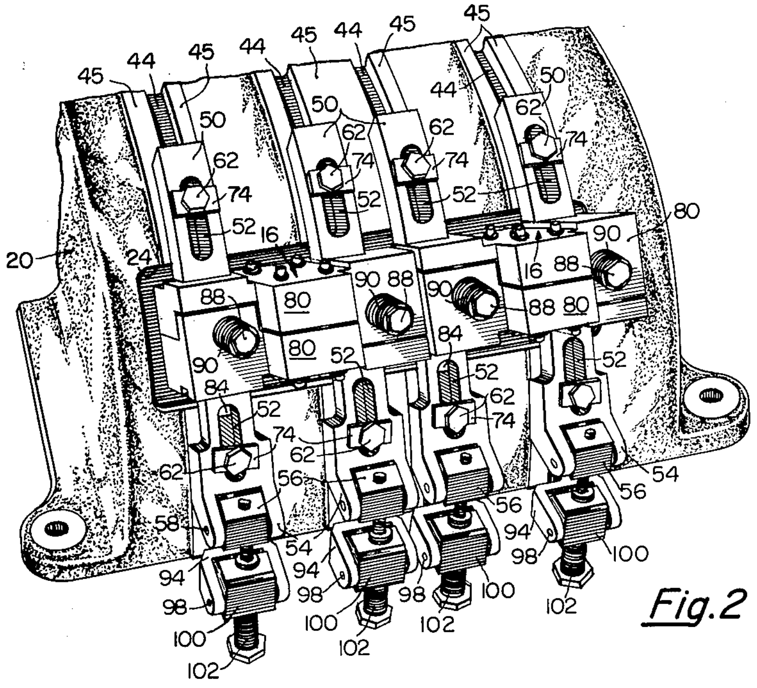
FIG. 2 is a perspective view of a pair of transducer heads and the adjusting structure therefor shown mounted on a fragmentary portion of the drum housing.
Figure 3:
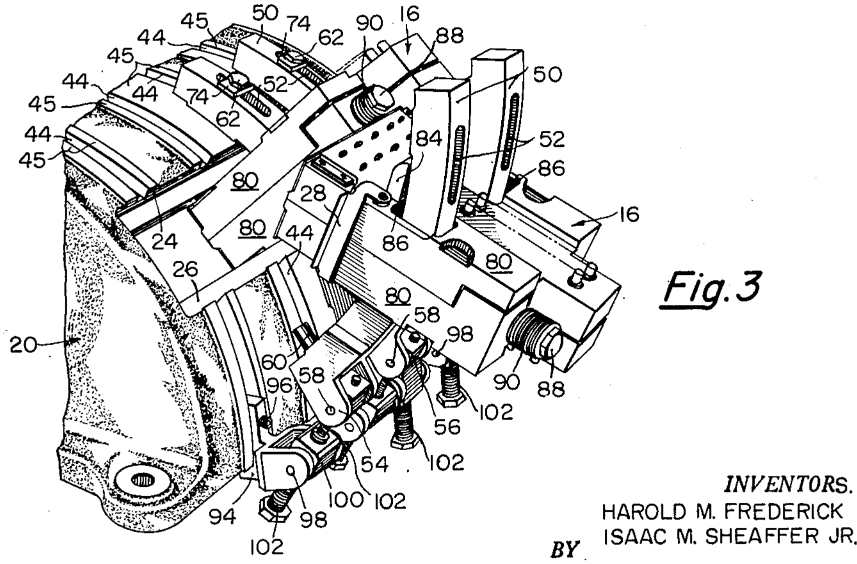
FIG. 3 is a perspective view of the transducer heads of FIG. 2 showing the heads retracted away from the housing for servicing.

As shown most clearly in FIGS. 2 and 3 the external peripheral surface of each of the two halves of the housing, only a fragment of one half portion being shown therein, is provided with a number of parallel spaced apart concentric grooves 44 bordered by raised tracks 45 accurately machined on a radius about the axis of drum 10. Similarly, as before mentioned, at regular intervals around the circumference of each half portion of the housing, apertures 24 are cut, cast or otherwise formed therein.

Figures 4, 5, 7:
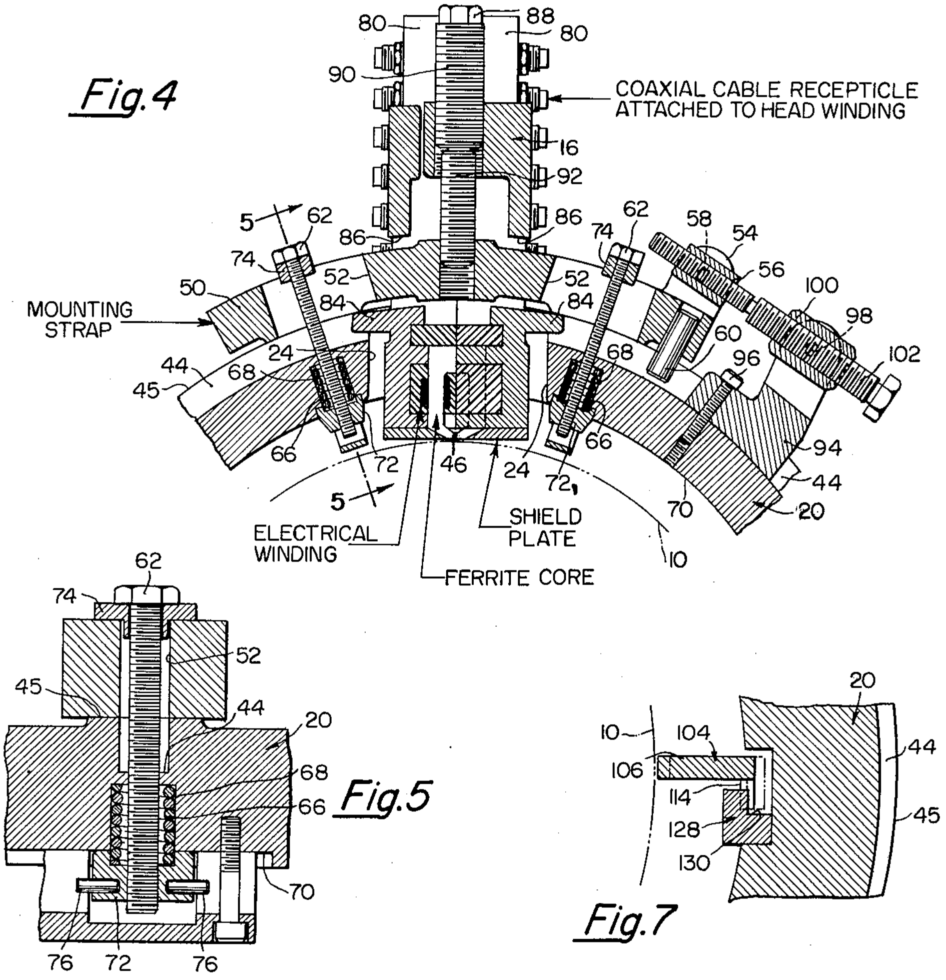
FIG. 4 is a sectional view of a single head and a portion of the drum housing.
FIG. 5 is a sectional view taken along the line 5—5 of FIG. 4 of a head tensioning device.
FIG. 7 is a sectional view along the line 7—7 of FIG. 6 illustrating the active and inactive positions of the obliterating magnet.

The individual electromagnetic transducer head units 16 are movably mounted within the drum housing, in a manner to be described presently, so that the portion of the units having the electrically active gaps 46, FIGS. 1 and 4, of the separate head assemblies project through the aforementioned apertures into close proximity with the peripheral surface of the drum 10.

In order to avoid the tangential displacement which is characteristic of many prior type transducer mounting assemblies, the device of the present invention utilizes a novel adjustable mounting apparatus for moving the transducer units 16 circumferentially around the drum housing 18 so that the transducer head to drum spacing is accurately and constantly maintained.

Referring now more particularly to FIG. 3 it will be seen that each head unit is provided with a pair of arcuately shaped elongated members or straps 50 having a pair of slots or openings 52 therethrough intermediate the ends thereof. Each strap 50 has its under surface accurately machined to seat upon raised portions 45 when assembled with the housing. One end of each member 50 is provided with an integral upstanding yoke portion 54. A threaded block 56 is pivotally mounted to the yoke portion 54 by means of a pin 58, FIGS. 1, 2 and 3 press fitted therein.

In order to effectively guide the straps 50 during movement thereof on tracks 45 around the periphery of the housing 18, a short pin or dowel 60, FIGS. 3 and 4, is fitted to the under side of each strap immediately adjacent the yoke portion 54. The pin 60 is of slightly less diameter than the width of grooves 44 and projects about ½ inch radially inwardly from the strap and is receivable in its respective groove 44 so as to permit the strap to move around the groove without yawing or cocking the sides thereof.

So that each of the members 50 may be held against housing 18 adjustable with respect to the surface thereof and yet be maintained under a predetermined tension during adjustment, mounting bolts 62 are provided. The bolts, as shown most clearly in FIGS. 4 and 5, pass through both the slots 52 and the housing 18. Coil springs 66, which are disposed in cylindrical recesses 68 in the housing inner surface 70, are placed under the desired degree of tension by means of the nut 72 into which each bolt is externally threaded and tightened. A rectangular washer 74 distributes the tightening pressure across the strap. A pair of pins 76 projecting from opposite sides of the nut prevent the nut from rotating and thus loosening the bolt 62.

As shown in FIG. 1 the magnetic transducer units of the present embodiment each consist of two complementary half sections 80—80 which have been secured together, by means of bolts 82. Each half section, as seen in FIG. 4, is provided with an alignment projection or tab 84. The tabs 84 are dimensioned so as to ride against the sides of grooves 44 when the head unit is in operative position and cooperate with pins 60 to align each "read" head with the magnetic track of its corresponding "write" head. It is apparent from FIG. 1 that the projecting tabs 84 when within their respective concentric grooves 44 permit the head package to be shifted or moved circumferentially of the periphery of the drum housing as shown most clearly in FIG. 2 while maintaining constant the track spacing measured parallel to the drum axis.

"Write" to "read" efficiency is approximately proportional to write-to-read head alignment. A read head 25% off center with respect to the written track will give only about 75% of the electrical output it would produce if it were accurately aligned with the tracks. Stray pick-up from adjacent tracks is also minimized by proper head alignment since a properly centered read head is also at the maximum possible distance from the adjacent tracks, as shown schematically in FIG. 8. The use of aligning tabs in the head permits close control of read to write head alignment without introducing large tolerance problems inherent with other alignment means.

Each transducer unit 16 is further provided with a pair of windows or openings 86 in the main body portion thereof, as shown in FIGS. 3 and 4. The curved straps 50 pass through these openings and the head units are secured to the straps by bolts 88. Vertical adjustment of the transducer units 16 with respect to the surface of the drum 10 is provided by means of the mounting bolts 88. Each bolt is provided with an upper threaded portion 90 engaging the head unit 16 and a lower threaded portion 92 of smaller diameter engaging the strap member 50. The larger diameter thread has the finer pitch so that the bolt may be inserted externally of the unit and so that right hand screw rotation results in advancement of the head unit 16 toward the drum 10.

In order to move strap 50 in an arcuate path on tracks 45, a stationary, bracket or yoke member 94, FIGS. 1, 2 and 4, is secured to the housing 18 as by bolts 96. Pivotally mounted in the yoke 94 by means of the press fitted pin 98 is a threaded block 100 similar to the block 56 in the yoke 54.

Differentially threaded members 102 interconnect block 56 with the block 100. Because block 94 is anchored, rotation of the threaded members 102 moves the strap circumferentially around the housing 18 against the applied tension of the bolts 62 in the strap slots 52. The straps are adapted to be moved approximately .006 inch for each differential screw revolution.

The adjusting apparatus of the present invention makes possible the accurate, efficient and easy spacing of pairs of head assemlies within extremely small angular tolerances, such, for example, an acceptable tolerance of plus or minus 4 seconds of a degree. Even closer spacing is attainable if desired. The above mentioned tolerances are based on an adjustment around an 8 inch diameter and of course vary as the diameter varies. A total circumferential displacement of the head units of approximately ⅛ inch is obtainable with the present invention. Obviously greater adjustment can be obtained by enlarging the apertures 24 and/or by altering the differential screw to provide greater overall travel thereof. While each head in the present embodiment is shown supported by two straps 50 it is understood, of course, that in some forms only one may be used.

Figure 6:
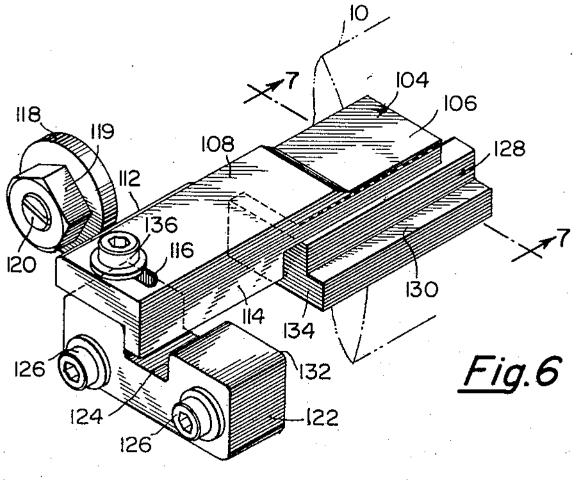
FIG. 6 is an isometric view of a portion of the obliterating magnet structure of the present invention.

In the system described herein utilizing the illustrated embodiment of the invention, information placed on the drum is "read" during each revolution thereof. Referring to FIGS. 1, 6 and 7 in order to "clean" the drum of its 96 tracks, i.e. remove the pulse information after each read operation is terminated, an erase magnet 104 is provide.

The magnet 104, shown most clearly in FIG. 6, is an elongated flat member in the shape of a bar and comprising a central permanent magnetic portion 106 and oppositely disposed non-magnetic end portions 108 of brass or other similar material. The magnet 104 is adapted to be introduced into the housing through an aperture 110, FIG. 1, cut or cast into the side thereof.

Each of the opposite non-magnetic ends of the permanent magnet 104 is enlarged, only one end being shown in FIG. 6. One side edge 112 of the enlarged end portion is chamfered or bevelled while the parallel opposite side portion depends from the main surface portion of the enlarged end to form an overhang or lip 114. A narrow adjusting slot 116 is drilled or otherwise formed in each enlarged end of the magnet.

One of a pair of eccentric members 118 is disposed on opposite respective sides of the upper half portion 20 of the housing member 18, only one member 118 being shown in FIG. 1. Members 118 are rotatable on the side wall of housing 18 by means of an adjusting nut 119 integral with each eccentric 118 and secured to the housing wall as by means of the screw 120. In a manner to be explained presently, the peripheral surface of each eccentric is engaged by the chamfered portion 112 of the magnet 104 so that clockwise rotation of eccentric 118 will adjustably move the magnet rearwardly within the housing. Conversely, counterclockwise adjustment or rotation of the eccentric permits the magnet to be adjustably moved forwardly of the housing so as to bring the magnet 104 into operative relationship with the peripheral surface portion of the drum 10.

The magnet 104 requires careful handling to prevent damage to it or to the surface of the drum. The polar face of the magnet i.e., the side facing the drum surface, is smooth and has sharp edges, therefore if the magnet is introduced carelessly into the aperture 110 the magnetizable drum surface may accidently become gouged or nicked thereby.

To prevent the magnet from damaging the frangible drum surface a mounting block 122 having a guiding slot 124 therein, is secured to the external edge of the respective erase magnet aperture 110 on opposite sides of housing 18 by means of the bolts 126. Internally of the housing 18 and affixed thereto in parallel relation with the drum axis is a support 128 having a ledge or step 130 milled into one face thereof to form a a guide along which lip 114 of the bar magnet 104 slides during its introduction into the housing.

It is apparent that the depending side portion 114 of the magnet 104 is of such dimension that when the latter is fully received within the housing 18 portion 114 will clear the end surface 134 of the support 128 so that the chamfered edges can be brought into engagement with the peripheral surfaces of eccentrics 118. Once the magnet is accurately located within the housing the bolts 136, one on each opposite end thereof, may be tightened through the slot 116 into the block 122 thus immobilizing the magnet.

It can now be seen that the magnet may easily be introduced into the housing 18 without contacting the drum surface since the ledge or sill 130 constantly abuts the depending lip 114 at all times during the travel of the magnet within the housing.

The magnet to drum spacing is in the order of approximately 10 mils. An initial rough adjustment is made simply by inserting the magnet within the housing, as described above, and as shown in broken line position in FIG. 7, and then sliding it inwardly along the ledge 130 until it abuts eccentrics 118 in the solid line position shown in FIG. 7.

Once roughly located within the housing, rotation of the eccentrics 118 permits the magnet to be accurately adjusted with respect to the drum surface until the exact tolerance desired is attained. Thereafter bolts 120 are tightened to secure the eccentric. Once the eccentric is locked in the desired position, any changes such as removal of the magnet from the housing will not disturb the setting of the magnet to drum spacing.

There has thus been described a data storage-delay line type magnetic drum structure which features a transducer head mounting device permitting heads to be permanently and accurately spaced from the drum surface while still permitting final circumferential relocation of the transducer units relative to one another.

The structure is relatively simply to assemble and can be adjusted easily and efficiently due to the novel arrangement of parts and the manner in which they are interconnected.

For convenience in service and repair the transducer head units may be lifted clear of the drum and out of the housing by virtue of the novel structure provided by the present invention which permits the withdrawal of the heads without dismantling the machine or destroying preset adjustments. A great saving in time and labor is thus effected.

While there has been described what is at present considered to be the preferred embodiment of this invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. Apparatus for retractibly mounting transducers in operative association with a drum type storage member comprising, a drum-like housing enclosing said storage member in co-axial relation therewith, said housing having an aperture therethrough and an elongated circumferential groove on its outer surface, said groove intersecting said aperture and having circumferential track portions on each side thereof, a head, and means adjustably mounting said head on said housing with a portion extending through said aperture in closed adjacency to the surface of said drum storage member, said last means comprising a support member having an arcuate face complementary to and engaging said tracks and movable longitudinally thereon, means pivotally mounting said support member on said housing for providing pivotal movement of said head into and out of operative association with said storage member, and means forming part of said pivotal mounting means operatively connected to said support member for adjusting the position of said support member circumferentially along said tracks.

2. Apparatus for adjustably and retractibly mounting electromagnetic transducer assemblies adjacent to a drum type record member comprising, a housing having a plurality of apertures therethrough, means mounting a transducer head assembly in each of said apertures, said mounting means comprising a pair of mounting arms, means in the housing including a pair of complementary parallel spaced apart grooves formed therein for slidably receiving and engaging said arms, a first mounting member for each of said arms secured to said housing, a second mounting member secured to one end of each of said arms, means cooperatively connecting each of the second mounting members of each of said arms with the first mounting members secured to said housing and providing longitudinal adjustment of the arms in said grooves, and means for adjusting said head assemblies relative to their respective pair of mounting arms.

3. A housing for a plurality of magnetic transducer head assemblies, said housing having a plurality of apertures therethrough, a transducer head assembly associated with each of said apertures and extending therethrough, said housing having arcuate complementary grooves formed in a surface thereof and extending generally circumferentially of the housing, each of said transducer head assemblies being provided with a pair of mounting arms slidable in said grooves, a first pivot member fixed to said housing, a second pivot member adjustably secured to one end of each of said arms, and means cooperatively, adjustably interengaging said first and second pivot members for moving the second member with respect to the first member so as to move said mounting arms in a circumferential direction about said housing thus to move said transducer assembly circumferentially within said aperture.

4. An adjustable mounting device for retractibly positioning electromagnetic transducer assemblies adjacent to a drum type record member comprising a radial housing enclosing said drum, said housing having a plurality of apertures therethrough, a transducer head assembly disposed in each one of said apertures, each of said head assemblies having an opposed pair of guiding tabs, each of said tabs projecting in opposite directions outwardly, laterally away from said head assembly, the housing being provided with complementary parallel spaced apart grooves on a radial surface thereof for engaging said tabs, a first pair of pivot members secured to said housing, a second pair of pivot members secured to said assemblies, means cooperatively engaging each of the second pivot members with the first pivot members permitting each said head assembly to be arcuately retractibly withdrawn from within its respective aperture, and means for adjusting the spacing between said first and second pairs of pivot members so as to move said transducer assemblies circumferentially of said apertures.

5. Apparatus for adjustably mounting an electromagnetic transducer assembly adjacent to a drum type record member comprising, a housing surrounding and enclosing said drum having a plurality of apertures therethrough, means mounting a transducer head assembly in each of said apertures, said mounting means comprising a pair of arcuate mounting arms, a pair of complementary grooves formed in said housing for slidably receiving and engaging said arms, a first pivot member for each of said arms being secured to said housing, a second pivot member secured to one end of each of said arms, means cooperatively connecting each of the second pivot members of said arms with the first pivot members secured to said housing to permit said arms and said head assembly to be retractibly removable from within said aperture, and means for adjusting the relative spacing between said first and second pivot members so as to move the associated transducer assembly circumferentially relative to said aperture.

6. Apparatus for mounting a transducer head adjacent a record member comprising, in combination; a housing surrounding and enclosing the record member and having a plurality of spaced apart apertures disposed around the peripheral surface theerof, each aperture exposing a different surface portion of said record member, a plurality of magnetic transducers, each transducer being provided with a central opening therethrough, means adjustably positioning each one of said transducers in a separate one of said spaced apertures, a first adjustment means for each of said transducers comprising a pair of mounting arms receivable through said central opening to which the transducer is attached and a pair of differentially threaded screws for moving said transducer relative to said arms, a second adjustment means for each of said transducers comprising a first yoke member for each arm secured to said housing, a second yoke member secured to one end of each arm, pivot means for said first and second yoke member, a differential pivot screw member interconnecting the pivot means of each of said first and said second yoke members and adapted upon movement thereof to circumferentially displace said arms and said transducers around the surface of said housing along said grooves.

7. A transducer mounting assembly including a support for adjustably positioning an electromagnetic transducer adjacent to a rotatable magnetic information storage drum comprising, a housing for said drum, said housing enclosing said drum and being provided with an opening extending through a circumferential wall, a magnetic transducer having its pole pieces projecting through said opening into close proximity with said drum, a plurality of arcuately elongated strap members disposed in spaced apart parallel planes and slidable circumferentially of said housing, adjusting means interconnecting said transducer and said elongated members and adapted upon movement of said elongated strap members to change the position of the transducer circumferentially with respect to the drum, an elongated magnetic member adjustably mounted in said housing with its long dimension parallel with the axis of rotation of said drum and adapted upon rotation of said drum past said member to obliterate magnetic information stored on said drum, and means in said housing engageable with said magnetic member for adjusting the relative spacing between said drum and said magnetic member.

8. Mounting apparatus for positioning an electromagnetic transducer adjacent a rotatable drum having a magnetizable periphery capable of storing information thereon comprising, a cylindrical housing enclosing said drum having a transducer receiving opening therein to afford access to the peripheral surface of the drum when said drum is mounted therein, said housing further including parallel spaced apart circumferentially extending tracks formed in the surface portion thereof adjacent to said opening and extending at least part way around the housing, an arcuate support conforming to the curvature of said tracks and slidably engaging the same, means pivotally mounting said arcuate support on said housing for swinging movement toward and away from the tracks, a magnetic transducer assembly, means mounting said magnetic tranducer assembly on and movable with said arcuate support and projecting through said opening in position adjacent to the periphery of the drum when the arcuate support is in engagement with the tracks, and means operatively associated with said pivotal mounting means for moving the arcuate support on said tracks to adjust the transducer assembly circumferentially with respect to said housing.

9. Mounting apparatus for positioning an electromagnetic transducer adjacent to a rotatable magnetic drum capable of storing information thereon comprising, a housing, a data storage drum having a magnetizable surface and being rotatably mounted within said housing, said housing being provided with a transducer receiving opening and further including an arcuate guiding track disposed in a surface portion of said housing and intersecting said opening, a movable arcuate supporting member slidable in said track and being provided with a pair of elongated longitudinal apertures therethrough and located on opposite sides of the opening, tensioning means received within each one of said apertures and engaging the housing and the supporting member to hold the latter in any adjusted position on the track, a magnetic transducing head carried by the supporting member and normally positioned in said opening, a fixed bracket on said housing, means pivotally mounting said supporting member on said fixed bracket for providing retractible movement of the transducer head out of said opening, said last means including an adjusting mechanism for differentially moving said supporting member along the track to vary the position of the transducing head in said opening, and means for differentially moving said transducer head perpendicularly of said supporting member so as to vary the position of the head relative to the magnetizable surface portion of said drum.

10. In a magnetic drum storage unit including a housing and a magnetic drum rotatably supported therein, said housing having an opening therein to afford access to the peripheral surface of said drum, a magnetic head assembly having a pole piece, means pivotally mounting said assembly on said housing for swingable movement toward and away therefrom whereby in one position said pole piece projects through said opening and is positioned adjacent the periphery of said drum to define an air gap and in another position said pole piece is withdrawn from said opening, and means to adjust the circumferential position of said assembly relative to said housing and to the surface of said drum.

11. In a magnetic drum storage unit including a housing and a magnetic drum rotatably supported therein, said housing having an opening therein to afford access to the peripheral surface of said drum, a magnetic head assembly having a pole piece, means pivotally mounting said assembly on said housing and providing swingable movement of the assembly from an operative position projecting through said opening with the pole piece adjacent the periphery of said drum to a retracted position removed from the opening, and means to adjust the circumferential position of said assembly on said housing without effecting the function of said pivotal mounting means.

12. In a magnetic drum unit, a rotary drum supported within a housing provided with an opening through which access is had to the drum, said opening being bounded by ledges, a magnetic head assembly pivotally supported between said ledges and including a holder having a body portion and oppositely directed extensions projecting laterally therefrom, said body portion extending through said opening and containing a magnetic head, means pivotally mounting one extension of said holder against one of said ledges, adjustable means for connecting the other extension to the other ledge to maintain a given position of said holder about said pivotal mounting, and means providing bodily adjustment of the head assembly on said ledges relative to said pivotal mounting.

References Cited in the file of this patent

UNITED STATES PATENTS

| | | |
|---|---|---|
| 440,817 | Rae | Nov. 18, 1890 |
| 1,501,878 | Burke | July 15, 1924 |
| 2,481,392 | Camras | Sept. 6, 1949 |
| 2,526,358 | Howell | Oct. 17, 1950 |
| 2,530,584 | Pontius | Nov. 21, 1950 |
| 2,769,037 | Dank et al. | Oct. 30, 1956 |
| 2,820,688 | Philbrick | Jan. 21, 1958 |
| 2,862,064 | Wallace et al. | Nov. 25, 1958 |
| 2,862,067 | Christoff | Nov. 25, 1958 |
| 2,864,892 | Perkins | Dec. 16, 1958 |
| 2,931,691 | Curtis et al. | Apr. 5, 1960 |
| 2,997,360 | Hanmer et al. | Aug. 22, 1961 |